United States Patent [19]
May

[11] Patent Number: 5,897,450
[45] Date of Patent: Apr. 27, 1999

[54] VARIABLE SPEED PULLEY ASSEMBLY

[76] Inventor: Leonhard May, 10757 Akins Rd., North Royalton, Ohio 44133

[21] Appl. No.: 08/950,431

[22] Filed: Oct. 15, 1997

[51] Int. Cl.[6] .............................. F16H 9/16; F16H 55/56
[52] U.S. Cl. ............................................... 474/32; 474/33
[58] Field of Search .................................. 474/8, 11, 12, 474/17, 24, 25, 27, 32, 33

[56] References Cited

U.S. PATENT DOCUMENTS

| | | | |
|---|---|---|---|
| 4,738,651 | 4/1988 | Favache et al. | 474/33 |
| 4,857,033 | 8/1989 | Czarka | 474/33 |
| 4,941,863 | 7/1990 | Sampei et al. | 474/33 |

*Primary Examiner*—John A. Jeffery
*Assistant Examiner*—Matthew A. Kaness
*Attorney, Agent, or Firm*—Tarolli, Sundheim, Covell, Tummino & Sazbo

[57] ABSTRACT

A variable speed pulley assembly for use with V-shaped drive and driven belts include a center pulley supported for rotation and movable axially in opposite directions between an outer drive pulley half and an outer driven pulley half. The center pulley comprises an inner drive pulley half and an inner driven pulley half fixed for rotation with each other. The inner drive pulley half has a first surface presented at an angle to an inner surface of the outer drive pulley half to define between them a drive pulley groove. The drive belt is received in the drive pulley groove and is movable radially in the drive pulley groove between a radially innermost position and a radially outermost position. The inner driven pulley half has a second surface presented at an angle to an inner surface of the outer driven pulley half to define between them a driven pulley groove. The driven belt is received in the driven pulley groove and is movable radially in the driven pulley groove between a radially innermost position and a radially outermost position. At least one of the drive pulley groove and the driven pulley groove has an included angle between the facing surfaces which define the at least one groove which included angle varies between the radially innermost position of the belt in the at least one groove and the radially outermost position of the belt in the at least one groove. The radially inner portions of the outer pulley halves are configured to enable the belts to drop down lower in the pulley grooves without getting stuck.

17 Claims, 4 Drawing Sheets

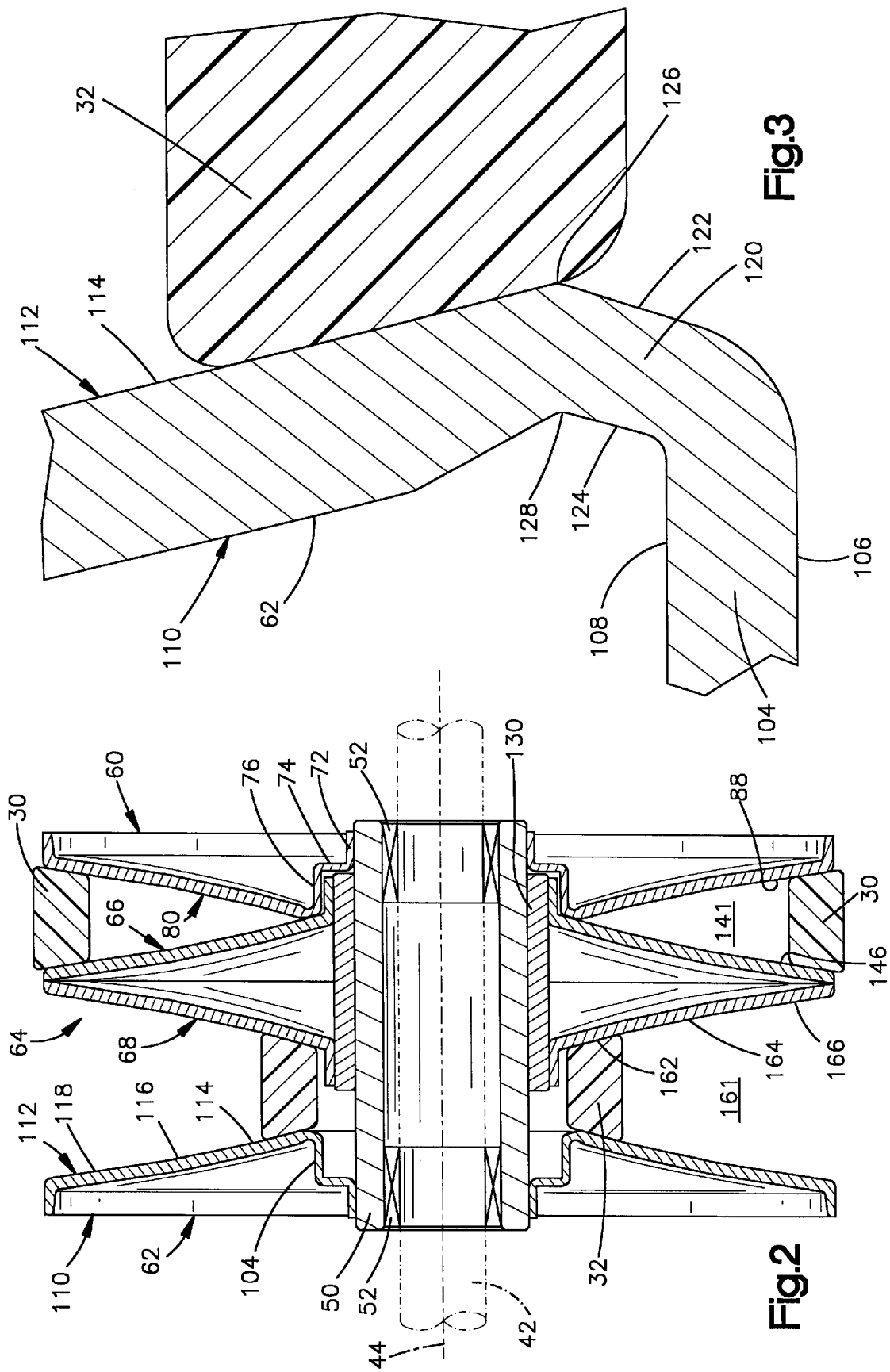

VARIABLE SPEED PULLEY ASSEMBLY

BACKGROUND OF THE INVENTION

The present invention relates to a variable speed pulley assembly. In particular, the present invention relates to a variable speed clutch or variable speed pulley assembly for use in a lawn tractor or garden tractor to vary the drive speed of the tractor while the engine speed remains constant.

Summary of the Invention

The present invention is a variable speed pulley assembly for use with a drive belt having a V-shaped cross-sectional configuration for transmitting driving force to the assembly, and a driven belt having a V-shaped cross-sectional configuration for transmitting driving force from the assembly. The pulley assembly includes an outer drive pulley half and an outer driven pulley half, supported for rotation with each other about an axis at locations spaced apart axially from each other. A center pulley is supported for rotation with the outer drive pulley half and the outer driven pulley half, about the axis, at a location axially intermediate the outer drive pulley half and the outer driven pulley half. The center pulley is movable axially in opposite directions between the outer drive pulley half and the outer driven pulley half. The center pulley comprises an inner drive pulley half and an inner driven pulley half fixed for rotation with each other. The inner drive pulley half has an outer surface presented at an angle to an inner surface of the outer drive pulley half to define between them a drive pulley groove. The drive belt is received in the drive pulley groove and is movable radially in the drive pulley groove between a radially innermost position and a radially outermost position. The inner driven pulley half has an outer surface presented at an angle to an inner surface of the outer driven pulley half to define between them a driven pulley groove. The driven belt is received in the driven pulley groove and is movable radially in the driven pulley groove between a radially innermost position and a radially outermost position.

At least one of the drive pulley groove and the driven pulley groove has an included angle between the facing surfaces which define the at least one groove. The included angle varies between the radially innermost position of the belt in the at least one groove and the radially outermost position of the belt in the at least one groove.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a sectional view of the pulley assembly of FIG. 1, shown in a high torque, low speed condition;

FIG. 3 is an enlarged view of a portion of FIG. 2;

DESCRIPTION OF A PREFERRED EMBODIMENT

Figure 1:
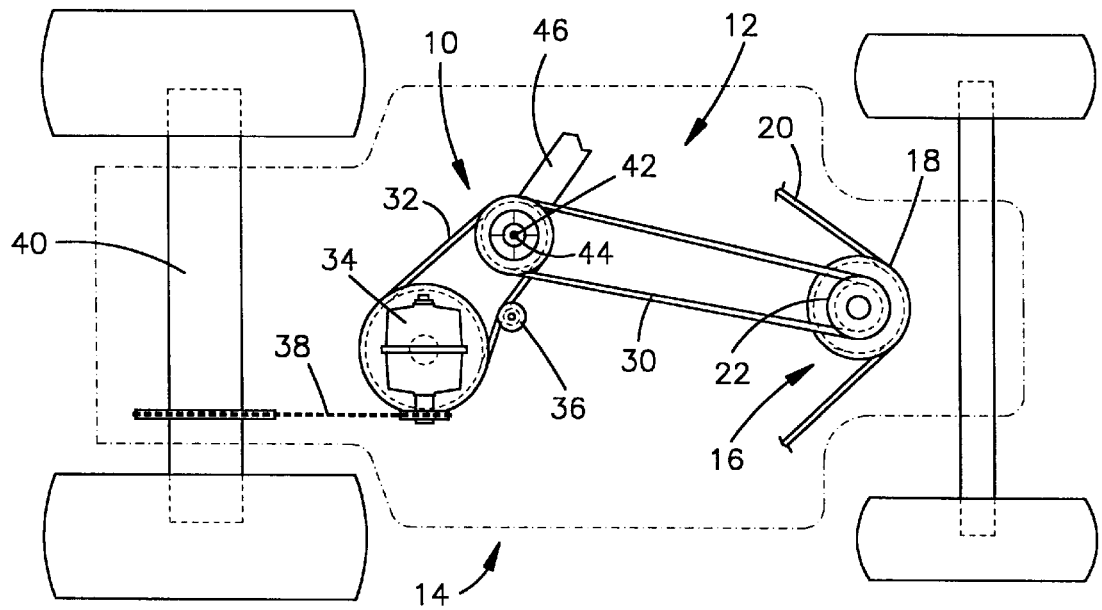
FIG. 1 is a schematic view of a tractor drive train which includes a variable speed pulley assembly constructed in accordance with the present invention.

The present invention relates to a variable speed pulley assembly. In particular, the present invention relates to a variable speed clutch or variable speed pulley assembly for use in a lawn tractor or garden tractor to vary the drive speed of the tractor while the engine speed remains constant. As representative of the present invention, FIG. 1 illustrates schematically a variable speed pulley assembly 10 constructed in accordance with the present invention.

The pulley assembly 10 is incorporated in the drive train 12 of a tractor 14. The drive train 12 includes an engine output pulley 16. One portion 18 of the engine output pulley 16 drives a belt 20 which drives an accessory such as grass cutting blades (not shown) of the tractor 14.

Another portion 22 of the engine output pulley drives a drive belt 30. The drive belt 30 is connected in a force-transmitting relationship, by the pulley assembly 10, to a driven belt 32. The driven belt 32 drives a transmission 34 of the tractor. The driven belt 32 is maintained in tension by an idler pulley 36.

The transmission 34 is connected through a drive chain 38 to a rear axle assembly 40 of the tractor 14. As a result, rotation of the engine output pulley 22, upon operation of the tractor's engine (not shown), causes the tractor 14 to be driven along the ground surface.

The pulley assembly 10 is supported on a shaft 42 for rotation about an axis 44. The shaft 42 is connected in a manner not shown to an arm 46. The arm 46 is movable in a known manner, in opposite directions transverse to the axis of rotation 44 of the pulley assembly 10, to move the pulley assembly radially relative to the axis. Such movement results in a change in the speed ratio between the drive belt 30 and the driven belt 32. This change results in a change in the speed of the tractor 14 over the ground surface.

The pulley assembly 10 (FIG. 2) includes a sleeve 50 supported on the shaft 42 by bearings 52 for rotation relative to the shaft. The pulley assembly 10 also includes an outer drive pulley half 60, an outer driven pulley half 62, and a center pulley 64. The center pulley 64 includes an inner drive pulley half 66 and an inner driven pulley half 68. The outer and inner drive pulley valves 60 and 66, together make up a drive pulley which receives the drive belt 30. The outer and inner driven pulley halves 62 and 68, together, make up a driven pulley which receives the driven belt 32.

The outer drive pulley half 60 is fixed to the sleeve 50 for rotation with the sleeve. The outer drive pulley half 60 is a single piece of sheet metal which is stamped and formed to the generally circular configuration shown in cross-section in FIG. 2. The outer drive pulley half 60 includes an axially extending portion 72 which is welded or otherwise secured to the sleeve 50. Another portion 74 of the outer drive pulley half 60 extends radially outward from the axially extending portion 72.

A support portion 76 of the outer drive pulley half 60 extends axially from the radially extending portion in a direction toward the center pulley 64. The support portion 76 has parallel, cylindrical inner and outer surfaces 78 and 79 which are centered on and extend parallel to the axis 44.

A main body portion 80 of the outer drive pulley half 60 has a generally conical configuration and extends generally radially outward from the support portion 76. The main body portion 80 has a belt engagement surface or inner surface 82 (FIGS. 5 and 6) which is presented axially inward of the pulley assembly 10, that is, in a direction toward the inner drive pulley half 66.

The inner surface 82 of the main body portion 80 has three distinct sections. A radially inner section 84 (FIGS. 5 and 6) of the inner surface 82 is configured as a frustum of a right circular cone centered on the axis 44. The inner section extends 84 at an angle of about 75° to the axis 44, that is, at an angle of about 15° to a plane perpendicular to the axis. The inner section 84 covers about the radially inner one third of the main body portion 80 of the outer drive pulley half 60.

A radially intermediate section 86 (FIGS. 5 and 6) of the inner surface 82, disposed radially outward of the inner section 84, is configured as a frustum of a right circular cone centered on the axis 44. The intermediate section 86 extends at an angle of about 78° to the axis 44, that is, at an angle of about 12° to a plane perpendicular to the axis. The intermediate section 86 covers about the radial central one third of the main body portion 80 of the outer drive pulley half 60.

A radially outer section 88 (FIGS. 5 and 6) of the inner surface 82, disposed radially outward of the intermediate section 86, is configured as a frustum of a right circular cone centered on the axis 44. The outer section 88 extends at an angle of about 81.5° to the axis 44, that is, at an angle of about 8.5° to a plane perpendicular to the axis. The outer section 88 covers about the radially outer one third of the main body portion 80 of the outer drive pulley half 60.

Figure 4:
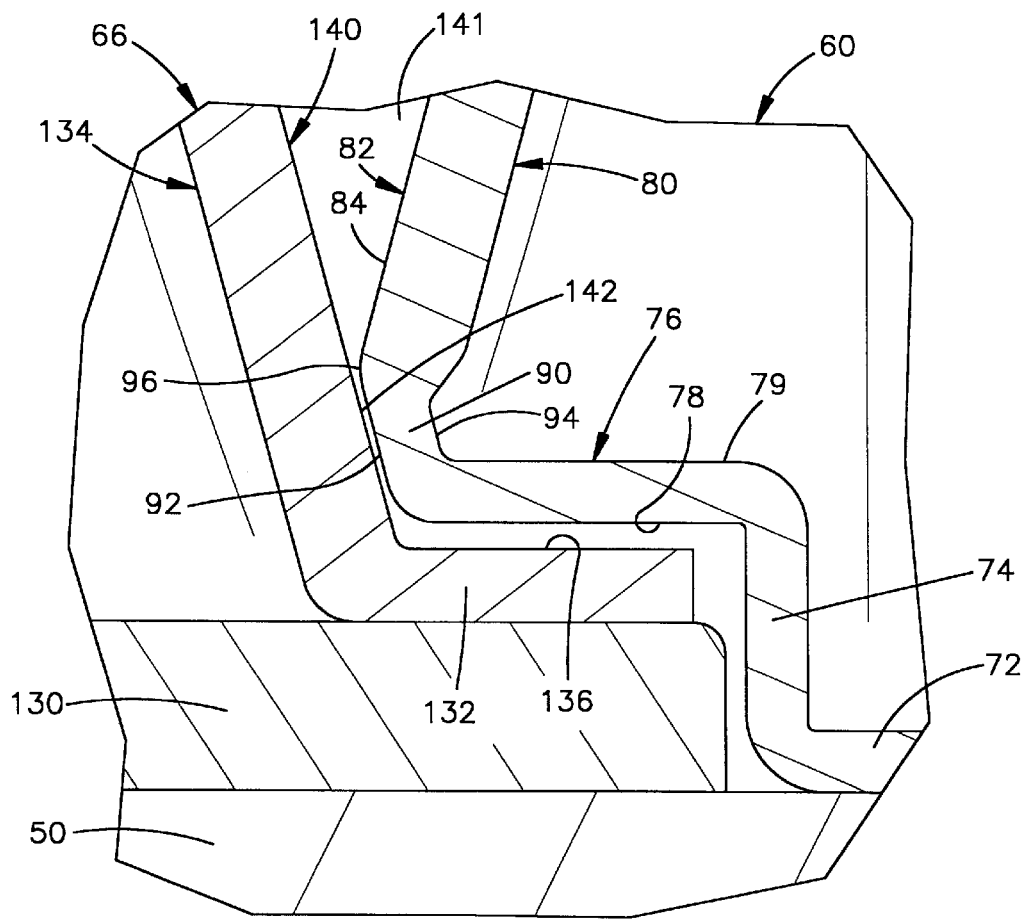
FIG. 4 is an enlarged view of another portion of FIG. 2.
Figure 5:
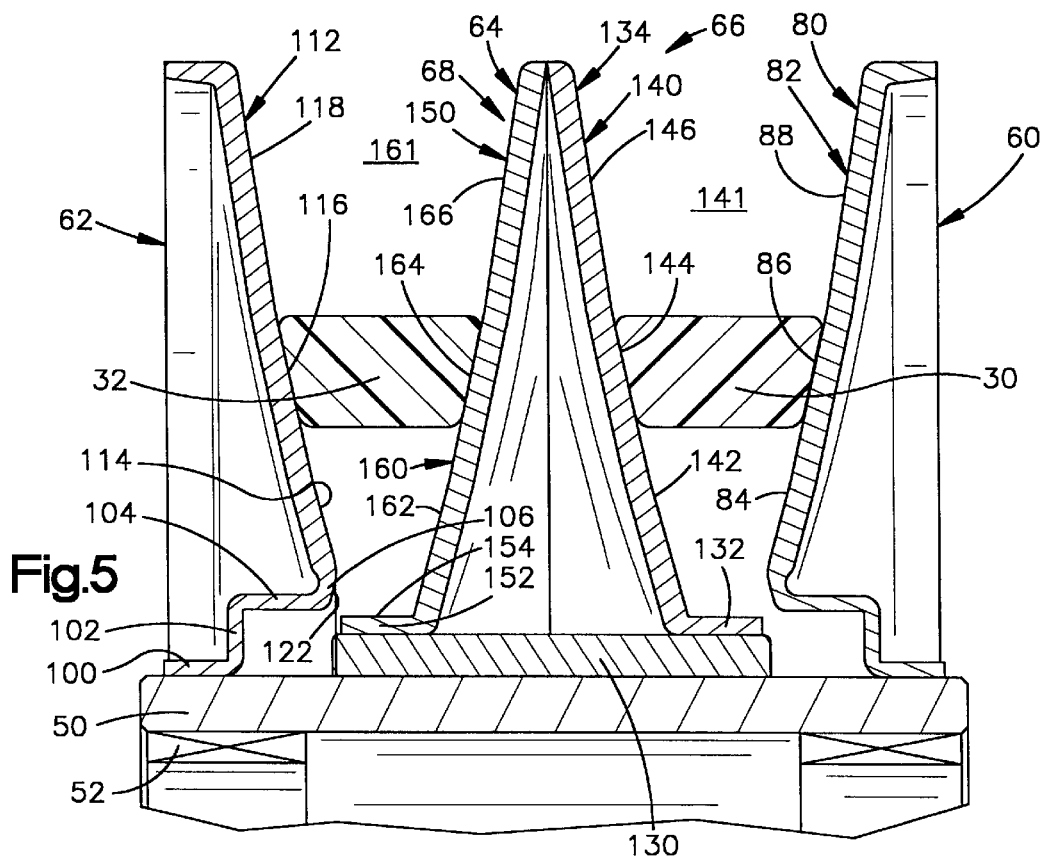
FIG. 5 is a view similar to FIG. 2 showing the pulley assembly in an intermediate condition.

At the area of connection between the main body portion 80 and the support portion 76, the outer drive pulley half 60 has a cross-sectional configuration as shown in FIG. 5. The outer drive pulley half includes a small connector section 90 (FIG. 4) which extends between and interconnects the main body portion 80 and the support portion 76. The main body portion 80 tapers to a narrower thickness at the connector section 90. The connector section 90 has a generally uniform cross-sectional thickness between opposite inner and outer surfaces 92 and 94. The inner and outer surfaces 92 and 94 are conical and have linear configurations when viewed in cross-section as in FIG. 3. The inner surface 92 of the connector section 90 extends at an angle of about 75° to the axis 44, that is, at an angle of about 15° to a plane perpendicular to the axis.

A sharp outside corner 96 (FIG. 4) is formed between the radially inner section 84 of the first surface 82 of the main body portion 80 of the outer drive pulley half 60, and the inner surface 92 of the connector section 90. The outside measurement of the angle of this corner is about 150°. The inside measurement of the angle is about 135°.

The outer surface 94 of the connector section 90 extends at an angle of about 105° to the radially outer surface 79 of the support portion 76. On the opposite side that corner has an arcuate configuration extending between the inner surface 92 of the connector section 90 and the radially inner surface 78 of the support portion 76.

The outer driven pulley half 62 is fixed to the sleeve for rotation with the sleeve. The outer driven pulley half 62 is a single piece of sheet metal which is stamped and formed to the configuration shown in FIG. 2.

The outer driven pulley half 62 (FIG. 5) includes an axially extending portion 100 which is welded or otherwise secured to the sleeve 50. Another portion 102 of the outer driven pulley half 62 extends radially outward from the axially extending portion 100.

A support portion 104 of the outer driven pulley half 62 extends axially from the radially extending portion 100 in a direction toward the center pulley 64. The support portion 104 has cylindrical inner and outer surfaces 106 and 108 (FIG. 3) which are centered on and extend parallel to the axis 44.

A main body portion 110 of the outer driven pulley half 62 has a generally conical configuration and extends generally radially outward from the support portion 104. The main body portion 110 has a belt engagement surface or inner surface 112 which is presented axially inward of the pulley assembly 10, that is, in a direction toward the inner driven pulley half 68.

The inner surface 112 of the main body portion has three distinct sections. A radially inner section 114 is configured as a frustum of a right circular cone centered on the axis 44. The inner section 114 extends at an angle of about 75° to the axis 44, that is, at an angle of about 15° to a plane perpendicular to the axis. The inner section 114 covers about the radially inner one third of the main body portion 110 of the outer driven pulley half 62.

A radially intermediate section 116 of the inner surface 112, disposed radially outward of the inner section 114, is configured as a frustum of a right circular cone centered on the axis 44. The intermediate section 116 extends at an angle of about 78° to the axis 44, that is, at an angle of about 12° to a plane perpendicular to the axis. The intermediate section 116 covers about the central one third of the radial extent of the main body portion 110 of the outer driven pulley half 62.

A radially outer section 118 of the inner surface 112, extending radially outward from the intermediate section 116, is configured as a frustum of a right circular cone centered on the axis 44. The outer section 118 extends at an angle of about 81.5° to the axis 44, that is, at an angle of about 8.5° to a plane perpendicular to the axis. The outer section 118 covers about the radially outer one third of the radial extent of the main body portion 110 of the outer driven pulley half 62.

At the area of connection between the main body portion 110 and the support portion 104, the outer driven pulley half 62 has a cross-sectional configuration as shown in FIG. 5. The outer driven pulley half 62 includes a small connector portion 120 which extends between and interconnects the main body portion 1 10 and the support portion 104.

The connector portion 120 has a generally uniform cross-sectional thickness between opposite inner and outer surfaces 122 and 124. The inner and outer surfaces 122 and 124 are conical and have linear configurations when viewed in cross-section as in FIG. 3. The inner surface 122 of the connector section 120 extends at an angle of about 75° to the axis 44, that is, at an angle of about 15° to a plane perpendicular to the axis.

The main body portion 110 tapers to a narrower thickness at the connector section 120. A sharp outside corner 126 is formed between the radially inner section 114 of the inner surface 112 of the main body portion 110 of the outer driven pulley half 62, and the inner surface 122 of the connector section 120. The outside measurement of the angle of this corner 126 is about 150°. The opposite inside corner angle measurement of 128 has a about 135°.

The outer surface 124 of the connector section 120 extends at an angle of about 105° to the radially outer surface 108 of the support portion 104. On the opposite side that corner has an arcuate configuration extending between the inner surface 122 of the connector section 120 and the radially inner surface 106 of the support portion 104.

The center pulley 64 is fixed for movement with a cylindrical center pulley support member 130. The center pulley support member 130 is slidable axially on the sleeve 50, to enable movement of the center pulley 64 in opposite directions between the axially fixed outer drive pulley half 62 and the axially fixed outer driven pulley half 64. The center pulley support member 130 is also rotatable on the sleeve 50, about the axis 44. The inner drive pulley half 66 and the inner driven pulley half 68, which together form the center pulley 64, are fixed to each other and to the center pulley support member 130.

The inner drive pulley half 66 (FIGS. 5 and 6) is a mirror image of the inner driven pulley half 68. The inner drive pulley half 66 has an annular, axially extending support portion 132 and a main body portion 134. The main body portion 134 extends generally radially outward from the support portion 132. The main body portion 134 is generally conical in configuration.

The support portion 132 has a cylindrical outer surface 136 (FIG. 4) which extends parallel to the axis 44. The diameter of the outer surface 136 of the support portion 132 of the inner drive pulley half 66 is less than the diameter of the inner surface 78 of the support portion 76 of the outer drive pulley half 60. As a result, the support portion 132 of the inner drive pulley half 66 is nestable within the support portion 76 of the outer drive pulley half 60, as viewed in FIGS. 2 and 4.

The main body portion 134 of the inner drive pulley half 66 has an outer surface 140 which is presented toward, or faces, the inner surface 82 of the main body portion 80 of the outer drive pulley half 60. The outer surface 140 of the inner drive pulley half 66 is a mirror image of the inner surface 82 of the outer drive pulley half 60. The outer surface 140 of the inner driven pulley half 66, and the inner surface 82 of outer drive pulley half 60, define between them a variable width drive pulley groove 141.

Specifically, the outer surface 140 of the inner drive pulley half 66 includes three distinct sections. A radially inner section 142 is configured as a frustum of a right circular cone centered on the axis 44. The inner section 142 extends at an angle of about 75° to the axis 44, that is, at an angle of about 15° to a plane perpendicular to the axis. The inner section 142 covers about one third of the radial extent of the main body portion 134 of the inner drive pulley half 66.

A radially intermediate section 144 of the outer surface 140 is configured as a frustum of a right circular cone centered on the axis 44. The intermediate section 144 extends at an angle of about 78° to the axis 44, that is, at an angle of about 12° to a plane perpendicular to the axis. The intermediate section 144 covers about one third of the radial extent of the main body portion 134 of the inner drive pulley half 66.

A radially outer section 146 of the outer surface 140 is configured as a frustum of a right circular cone centered on the axis 44. The outer section 146 extends at an angle of about 81.5° to the axis 44, that is, at an angle of about 8.5° to a plane perpendicular to the axis. The outer section 146 covers about one third of the radial extent of the main body portion 134 of the inner drive pulley half 66.

The inner driven pulley half 68 has an annular, axially extending support portion 150 and a main body portion 152. The main body portion 150 extends generally radially outward from the support portion 152. The main body portion 150 is generally conical in configuration.

The support portion 152 has a cylindrical outer surface 154 which extends parallel to the axis 44. The diameter of the outer surface 154 of the support portion 152 of the inner driven pulley half 68 is less than the diameter of the inner surface 106 of the support portion 104 of the outer driven pulley half 62. As a result, the support portion 154 of the inner driven pulley half 68 is nestable within the support portion 104 of the outer driven pulley half 62, as viewed in FIG. 6.

The main body portion 150 of the inner driven pulley half 68 has an outer surface 160 (FIG. 5) which is presented toward, or faces, the inner surface 112 of the main body portion 110 of the outer driven pulley half 62. The outer surface 160 of the inner driven pulley half 68 is a mirror image of the inner surface 112 of the outer driven pulley half 62.

Specifically, the outer surface 160 of the inner driven pulley half 68 includes three distinct sections. A radially inner section 162 is configured as a frustum of a right circular cone centered on the axis 44. The inner section 162 extends at an angle of about 75° to the axis 44, that is, at an angle of about 15° to a plane perpendicular to the axis. The inner section 162 covers about one third of the radial extent of the main body portion 150 of the inner driven pulley half 68.

A radially intermediate section 164 of the outer surface is configured as a frustum of a right circular cone centered on the axis 44. The intermediate section 164 extends at an angle of about 78° to the axis 44, that is, at an angle of about 12° to a plane perpendicular to the axis. The intermediate section 164 covers about one third of the radial extent of the main body portion 150 of the inner driven pulley half 68.

A radially outer section 166 of the outer surface is configured as a frustum of a right circular cone centered on the axis 44. The outer section 166 extends at an angle of about 81.5° to the axis, that is, at an angle of about 8.5° to a plane perpendicular to the axis 44. The outer section 166 covers about one third of the radial extent of the main body portion 150 of the inner driven pulley half 68.

Upon startup of the drive train 12, the pulley assembly 10 is in the condition shown in FIG. 2. The center pulley 64 is in a position shifted axially closest to the drive pulley outer half 60 and farthest from the driven pulley outer half 62—that is, to the right as viewed in FIGS. 4–7. This is a high torque, low speed condition.

The drive belt 30 is in a radially outward position in the drive pulley groove 141 in the pulley assembly. The driven belt 32 is in a radially inward position in the driven pulley groove 161 in the pulley assembly 10. Specifically, the driven belt 32 is in its radially innermost position in the driven pulley groove 161. The driven belt 32 is in engagement with the radially inner section 162 of the inner driven pulley half 68, and with the radially inner section 114 of the outer driven pulley half 62. The driven belt 32 is in a portion of the driven pulley groove 161 which has an included angle of 30°, that is, between the two 15° faces of the pulley halves 62 and 68.

The drive belt 30 is in its radially outermost position in the drive pulley groove 141. The drive belt 30 is in engagement with the radially outer section 146 of the inner drive pulley half 66, and with the radially outer section 88 of the outer drive pulley half 60. The drive belt 30 is in a portion of the drive pulley groove 141 which has an included angle of 17°, that is, between the two 8.5° faces of the pulley halves 60 and 66.

In this condition of the pulley assembly 10, the inner drive pulley half 66 abuttingly engages the outer drive pulley half 60 (the parts, for clarity, shown slightly spaced apart in FIG. 4). The support portion 132 of the inner drive pulley half 66 is nested radially inward of the support portion 76 of the outer drive pulley half 60.

The radially inner section 142 of the outer surface 140 of the main body portion 134 of the inner drive pulley half 66 is in abutting engagement with the inner surface 92 of the connector portion 90 of the outer drive pulley half 60. Both the surface 142 and the surface 92 extend at an angle of 75° to the axis; this allows the abutting engagement between the surfaces. As a result, the inner and outer drive pulley halves 66 and 60 can come very close together axially, and so the drive belt 30 is moved very far radially out.

Upon movement of the arm 46 in a first direction transverse to the axis 44 of rotation of the pulley assembly 10, the center pulley 64 moves axially in a direction away from the drive pulley outer half 60 and toward the driven pulley outer half 62 (from right to left as viewed in FIGS. 4–7). Such movement results in a change in the speed ratio between the drive belt 30 and the driven belt 32.

Specifically, the drive belt 30 moves from its radially outermost position in the drive pulley groove 141 to a position (FIG. 5) in which the drive belt is in engagement with the radially intermediate section 144 of the inner drive pulley half 66, and with the radially intermediate section 86 of the outer drive pulley half 60. The drive belt 30 is in a portion of the drive pulley groove 141 which has an included angle of 24°, that is, between the two 12° faces of the pulley halves 66 and 60.

The driven belt 32 moves from its radially innermost position in the driven pulley groove 161 to a position in engagement with the radially intermediate section 164 of the inner driven pulley half 68, and with the radially intermediate section 116 of the outer driven pulley half 62. The driven belt 32 is in a portion of the driven pulley groove 161 which has an included angle of 24°, that is, between the two 12° faces of the pulley halves 62 and 68.

In this condition, the pulley assembly 10 is in a medium torque, medium speed condition. The speed ratio between the drive belt 30 and the driven belt 32 is decreased from the starting condition; the driven belt moves faster for each degree of movement of the drive belt. The speed of the tractor 14 over the ground surface increases.

Upon continued movement of the arm 46 in the first direction transverse to the axis 44 of rotation of the pulley assembly 10, the center pulley 64 (FIG. 6) moves axially into engagement with the outer driven pulley half 62. The radially inner section 162 of the inner driven pulley half 68 abuttingly engages the inner surface 122 on the connector section 120 of the outer driven pulley half 62.

Figure 6:
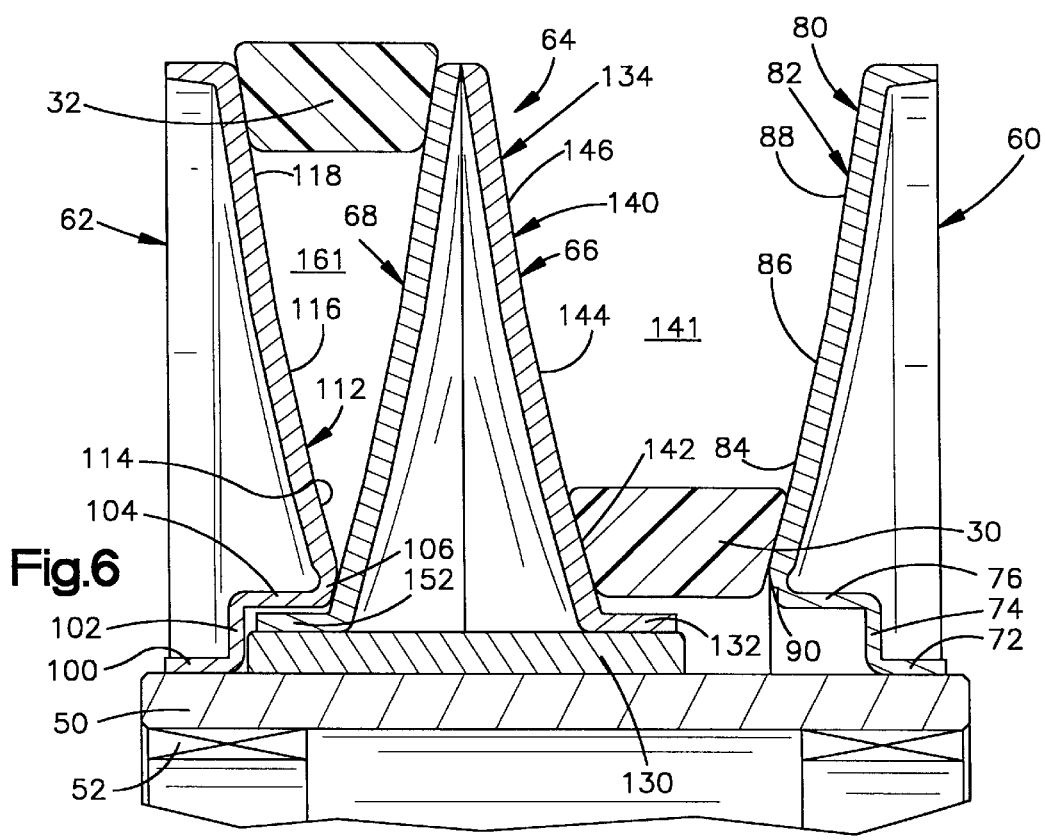
FIG. 6 is a view similar to FIG. 2 showing the pulley assembly in a low torque, high speed condition.

The drive belt 30 moves from its radially intermediate position in the drive pulley groove 141 to a radially innermost position as shown in FIG. 6 in which the drive belt is in engagement with the radially inner section 142 of the inner drive pulley half 64, and with the radially inner section 84 of the outer drive pulley half 60. The drive belt 30 is in a portion of the drive pulley groove 141 which has an included angle of 30°, that is, between the two 15° faces of the pulley halves.

The driven belt 32 moves from its radially intermediate position in the driven pulley groove 161 to a radially outermost position in engagement with the radially outermost section 166 of the inner driven pulley half 68, and with the radially outermost section 118 of the outer driven pulley half 62. The driven belt 32 is in a portion of the driven pulley groove 161 which has an included angle of 17°, that is, between the two 8.5° faces of the pulley halves 68 and 62.

In this condition, the pulley assembly 10 is in a low torque, high speed condition. The speed ratio between the drive belt 30 and the driven belt 32 is at its least; the driven belt moves fastest for each degree of movement of the drive belt. The speed of the tractor 10 over the ground surface is at its greatest.

In this type of application, the narrower the included angle (between opposed pulley faces), the greater is the tendency for the belt to get stuck between the pulley faces. It is, therefore, desirable to have a wide pulley angle. However, the wider the pulley angle, the lower is the overall speed ratio change which can be obtained from the same axial amount of pulley movement.

Figures 7, 8:
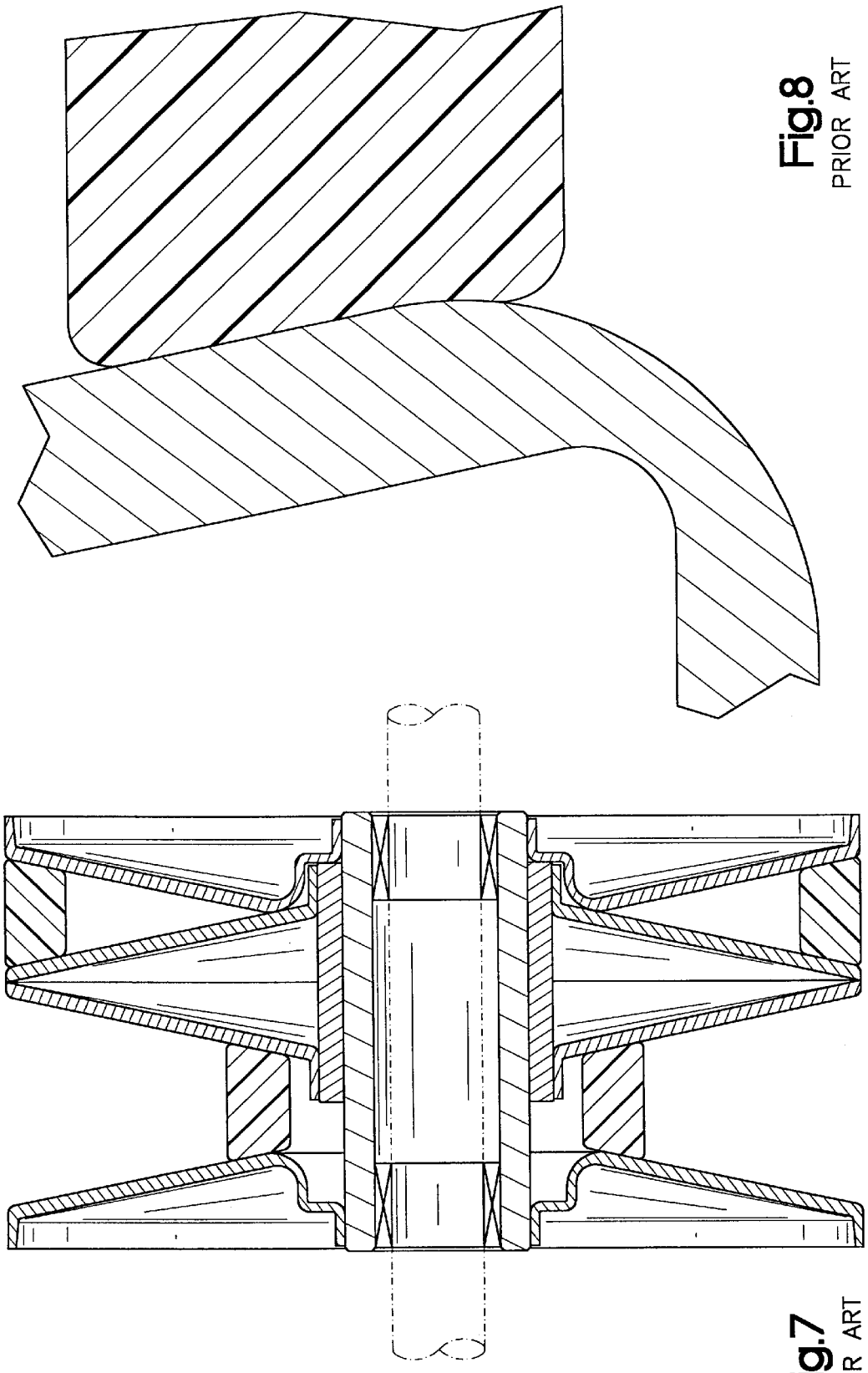
FIG. 7 is a view similar to FIG. 2 of a Prior Art pulley assembly.
FIG. 8 is a view similar to FIG. 3 of the Prior Art pulley assembly of FIG. 7.

For example, in the prior art pulley assembly shown in FIGS. 7 and 8, the belts are the commonly used 30°–32° V-belts. The pulley faces are at a constant 24 degree angle, as a compromise between 30° which would be desirable at the radial insides of the pulley grooves and an amount less than 24° which would be desirable at the radial outsides of the pulley grooves.

In the present invention, the drive belt 30 and the driven belt 32 are also the commonly used 30° V-belts, as typical in this application. Because of the varying angles of the surfaces of the pulley halves 60, 62, 66 and 68, the included angle between the facing pulley halves is wider at a radially inward position and decreases going radially out. Specifically, the included angle is 30 degrees at the radially inner portions of the pulleys; changes to 24° at the radially intermediate positions; and changes to 17° at the radially outer sections.

As a result, the drive belt 30, when in the low torque position shown in FIG. 6, is in a 30° included angle groove. This minimizes the possibility of the drive belt 30 getting stuck in the drive pulley groove 141.

Similarly, the driven belt 32, when in the high torque starting position shown in FIG. 2, is in a 30° included angle groove. This minimizes the possibility of the driven belt 32 getting stuck in the driven pulley groove 161.

Also, this wide included angle allows the belts 30 and 32 to drop down farther in the grooves 141 and 161, respectively, because the belts are in engagement with a conical (linear in cross-sectional configuration) surface on the respective outer pulley half, as opposed to riding on the prior art radiused surface (see FIG. 8) where the belt loses driving force and gets stuck more easily also.

Because the drive belt 30 can drop down farther in the drive pulley groove 141 and still engage and drive well, the center pulley 64 can be moved farther away from the outer drive pulley half 60 when the drive belt is radially inward. Similarly, because the driven belt 32 can drop down farther in the driven pulley groove 161, the center pulley 64 can be moved farther away from the outer driven pulley half 62 when the driven belt 32 is radially inward.

This means that keeping the same axial spacing between the outer pulley halves 60 and 62, there is possible more axial movement of the center pulley 64, which produces a greater speed ratio change. Specifically, dropping the small diameter belt farther down in the pulley groove provides a smaller minimum pulley diameter, increasing the overall speed ratio. At the same time, as the center pulley goes closer to the other pulley half, the large diameter belt is forced farther radially outward in the groove between them. This provides a larger maximum pulley diameter, again increasing the overall speed ratio.

In addition, because the small diameter belt is flat on the pulley surfaces when the belt is riding down low in the groove, there is more surface area of engagement for the belt when it is at its smallest diameter, producing greater belt life and a smoother engagement.

As the desired tractor speed increases and the driven belt 32 moves radially outward, the included angle of the driven pulley groove narrows to 24° and then to 17° at its outer position. This lesser included angle tends to push the driven belt 32 out farther (faster) for the same amount of axial movement of the center pulley 64, than in the prior art constant 24° angle, producing a greater speed change—that is, a speed curve with an increasing slope, rather than a constant slope. Test data show that the mile per hour curve is lower for a longer period of time as compared to the prior art pulley assembly shown in FIGS. 7 and 8, then steepens. For example, the pulley assembly 10 may provide the tractor 14 with five gears below, say, 5 mph, while the prior art pulley assembly takes only four gears to attain that speed. This provides the operator with more flexibility, i.e., more gears in the cutting range. At the same time, the pulley assembly 10 provides a higher maximum speed because the driven belt 32 moves farther radially out in the 17° included angle portion of the driven pulley groove 161. The prior art pulley assembly shown in FIGS. 7 and 8 provides only about a 4 to 1 speed ratio. The pulley assembly of the present invention provides about a 5 to 1 speed ratio.

From the above description of the invention, those skilled in the art will perceive improvements, changes and modifications in the invention. Such improvements, changes and modifications within the skill of the art are intended to be covered by the appended claims.

Having described the invention, I claim:

1. A variable speed pulley assembly for use with a drive belt having a V-shaped cross-sectional configuration for transmitting driving force to said assembly and a driven belt having a V-shaped cross-sectional configuration for transmitting driving force from said assembly, said pulley assembly comprising:

an outer drive pulley half and an outer driven pulley half supported for rotation with each other about an axis at locations spaced apart axially from each other;

a center pulley supported for rotation with said outer drive pulley half and said outer driven pulley half about said axis at a location axially intermediate said outer drive pulley half and said outer driven pulley half, said center pulley being movable axially in opposite directions between said outer drive pulley half and said outer driven pulley half, said center pulley comprising an inner drive pulley half and an inner driven pulley half fixed for rotation with each other;

said inner drive pulley half having an outer surface presented at an angle to an inner surface of said outer drive pulley half to define between them a drive pulley groove, the drive belt being received in said drive pulley groove and being movable radially in said drive pulley groove between a radially innermost position and a radially outermost position;

said inner driven pulley half having an outer surface presented at an angle to an inner surface of said outer driven pulley half to define between them a driven pulley groove, the driven belt being received in said driven pulley groove and being movable radially in said driven pulley groove between a radially innermost position and a radially outermost position;

at least one of said drive pulley groove and said driven pulley groove having an included angle between the facing surfaces which define said at least one groove which included angle varies between the radially innermost position of the belt in said at least one groove and the radially outermost position of the belt in said at least one groove.

2. A pulley assembly as set forth in claim 1 wherein the included angle of said at least one groove is about 30° at the radially innermost position of the belt in said at least one groove.

3. A pulley assembly as set forth in claim 2 wherein the included angle of said at least one groove is about 17° at the radially outermost position of the belt in said at least one groove.

4. A pulley assembly as set forth in claim 3 wherein the included angle of said at least one groove is about 24° at a radially intermediate position of the belt in said at least one groove.

5. A pulley assembly as set forth in claim 1 wherein said drive pulley groove has an included angle between the facing surfaces which define said drive pulley groove which included angle varies between the radially innermost position of the drive belt in said drive belt groove and the radially outermost position of the drive belt in said drive belt groove, and said driven pulley groove has an included angle between the facing surfaces which define said driven pulley groove which included angle varies between the radially innermost position of the driven belt in said at driven belt groove and the radially outermost position of the driven belt in said at driven belt groove.

6. A pulley assembly as set forth in claim 5 wherein the included angle of each one of said drive pulley groove and said driven pulley groove is about 30° at the radially innermost positions of the respective belts in said grooves.

7. A pulley assembly as set forth in claim 6 wherein the included angle of each one of said drive pulley groove and said driven pulley groove is about 17° at the radially outermost positions of the respective belts in said grooves.

8. A pulley assembly as set forth in claim 7 wherein the included angle of each one of said drive pulley groove and said driven pulley groove is about 24° at a radial position intermediate the radially innermost and radially outermost positions of the respective belts in said grooves.

9. A pulley assembly as set forth in claim 1 wherein said drive pulley has a sharp outside corner of about 105° which forms the radially inner edge of said inner surface of said drive pulley half.

10. A pulley assembly as set forth in claim 9 wherein the portion of said inner surface of said drive pulley half adjacent to said outside corner has a linear cross-sectional configuration and is formed as a frustum of a right circular cone.

11. A pulley assembly as set forth in claim 1 wherein said drive pulley half comprises a piece of sheet metal bent at two corners between a generally radially extending portion of said drive pulley half which has said inner surface of said drive pulley half and an axially extending portion of said drive pulley half, each one of said corners having an inside measurement of more than 90°.

12. A variable speed pulley assembly for use with a drive belt having a V-shaped cross-sectional configuration for transmitting driving force to said assembly and a driven belt having a V-shaped cross-sectional configuration for transmitting driving force from said assembly, said pulley assembly comprising:

an outer drive pulley half and an outer driven pulley half supported for rotation with each other about an axis at locations spaced apart axially from each other;

a center pulley supported for rotation with said outer drive pulley half and said outer driven pulley half about said axis at a location axially intermediate said outer drive pulley half and said outer driven pulley half, said center pulley being movable axially in opposite directions between said outer drive pulley half and said outer driven pulley half, said center pulley comprising an inner drive pulley half and an inner driven pulley half fixed for rotation with each other;

said inner drive pulley half having an outer surface presented at an angle to an inner surface of said outer drive pulley half to define between them a drive pulley groove, the drive belt being received in said drive pulley groove and being movable radially in said drive pulley groove between a radially innermost position and a radially outermost position;

said inner driven pulley half having an outer surface presented at an angle to an inner surface of said outer driven pulley half to define between them a driven pulley groove, the driven belt being received in said driven pulley groove and being movable radially in said driven pulley groove between a radially innermost position and a radially outermost position;

a radially inner section of said inner surface of said outer drive pulley half having a linear cross-sectional configuration and having a lower edge formed as a corner between said inner section and a connector surface on said outer drive pulley half, said inner surface section extending at a predetermined angle relative to a plane normal to said axis, said connector surface extending as a mirror image of said inner section at the same angle relative to said plane normal to said axis wherein said drive pulley groove has an included angle between the facing surfaces which define said drive pulley groove which included angle varies between the radially innermost position of the drive belt in said drive belt groove and the radially outermost position of the drive belt in said drive belt groove, and said driven pulley groove has an included angle between the facing surfaces which define said driven pulley groove which included angle varies between the radially innermost position of the driven belt in said at driven belt groove and the radially outermost position of the driven belt in said at driven belt groove.

13. A pulley assembly as set forth in claim 12 wherein said predetermined angle is 15°.

14. A pulley assembly as set forth in claim 12 wherein the included angle of said at least one groove is about 30° at the radially innermost position of the belt in said at least one groove; and the included angle of said at least one groove is about 17° at the radially outermost position of the belt in said at least one groove; and the included angle of said at least one groove is about 24° at a radially intermediate position of the belt in said at least one groove.

15. A variable speed pulley assembly for use with a drive belt having a V-shaped cross-sectional configuration for transmitting driving force to said assembly and a driven belt having a V-shaped cross-sectional configuration for transmitting driving force from said assembly, said pulley assembly comprising:

an outer drive pulley half and an outer driven pulley half supported for rotation with each other about an axis at locations spaced apart axially from each other;

a center pulley supported for rotation with said outer drive pulley half and said outer driven pulley half about said axis at a location axially intermediate said outer drive pulley half and said outer driven pulley half, said center pulley being movable axially in opposite directions between said outer drive pulley half and said outer driven pulley half, said center pulley comprising an inner drive pulley half and an inner driven pulley half fixed for rotation with each other;

said inner drive pulley half having an outer surface presented at an angle to an inner surface of said outer drive pulley half to define between them a drive pulley groove, the drive belt being received in said drive pulley groove and being movable radially in said drive pulley groove between a radially innermost position and a radially outermost position;

said inner driven pulley half having an outer surface presented at an angle to an inner surface of said outer driven pulley half to define between them a driven pulley groove, the driven belt being received in said driven pulley groove and being movable radially in said driven pulley groove between a radially innermost position and a radially outermost, position;

a radially inner section of said outer surface of said inner drive pulley half having a linear cross-sectional configuration and extending at a predetermined angle relative to a plane normal to said axis, said outer drive pulley half having a connector surface extending at the same angle relative to said plane normal to said axis but on an opposite side of said plane whereby said radially inner section of said outer surface and said connector surface are in abutting engagement when said center pulley reaches its limit of axial movement in a direction toward said outer drive pulley half wherein said drive pulley groove has an included angle between the facing surfaces which define said drive pulley groove which included angle varies between the radially innermost position of the drive belt in said drive belt groove and the radially outermost position of the drive belt in said drive belt groove, and said driven pulley groove has an included angle between the facing surfaces which define said driven pulley groove which included angle varies between the radially innermost position of the driven belt in said at driven belt groove and the radially outermost position of the driven belt in said at driven belt groove.

16. A pulley assembly as set forth in claim 15 wherein said predetermined angle is 75°.

17. A pulley assembly as set forth in claim 15 wherein the included angle of said at least one groove is about 30° at the radially innermost position of the belt in said at least one groove; and the included angle of said at least one groove is about 17° at the radially outermost position of the belt in said at least one groove; and the included angle of said at least one groove is about 24° at a radially intermediate position of the belt in said at least one groove.

* * * * *